United States Patent [19]

Fambrough

[11] Patent Number: 4,715,844

[45] Date of Patent: Dec. 29, 1987

[54] ALTERNATOR AND GENERATOR BELT TENSIONING DEVICE

[76] Inventor: David G. Fambrough, 13205 South Hills Dr., Reno, Nev. 89511

[21] Appl. No.: 858,112

[22] Filed: May 1, 1986

[51] Int. Cl.[4] .............................................. F16H 7/12
[52] U.S. Cl. ........................................ 474/130; 81/64
[58] Field of Search ............... 474/130, 101, 119, 113, 474/114; 81/64, 65, 3.43, 3.42; 254/131

[56] References Cited

U.S. PATENT DOCUMENTS

| | | | |
|---|---|---|---|
| 1,399,885 | 12/1921 | Ryan | 81/65 |
| 1,466,196 | 8/1923 | Seiders | 81/64 |
| 1,659,599 | 2/1928 | Gibson | 81/65 X |
| 2,427,353 | 9/1947 | Gagesteyn | 81/3.43 X |
| 2,503,189 | 4/1950 | Biba, Jr. | 81/3.43 X |
| 2,651,957 | 9/1953 | Phillips | 81/64 X |
| 2,655,824 | 10/1953 | Land et al. | 81/64 X |
| 4,244,559 | 1/1981 | Mote | 254/131 X |
| 4,529,170 | 7/1985 | Whitt, Sr. et al. | 81/64 X |

FOREIGN PATENT DOCUMENTS 361416  10/1922  Fed. Rep. of Germany ....... 81/3.43

Primary Examiner—James A. Leppink
Assistant Examiner—David J. Bagnell

[57] ABSTRACT

A tool for gripping and moving an alternator or generator about a pivot point on an engine, or the like, to tighten the driven pulley of the alternator or generator against a drive belt or chain. A handle attached by a swivel connection to an adjustable pressure pad to aid in such moving motion. A flat band capable of being disconnected at one point to allow the tool to encircle an alternator or generator housing. The pressure pad affixed to the band in such a manner as to allow a screw-like advancement of the pad between the band and the alternator or generator housing. A friction coating covering both the band and the pad.

2 Claims, 4 Drawing Figures

U.S. Patent Dec. 29, 1987 Sheet 1 of 1 4,715,844
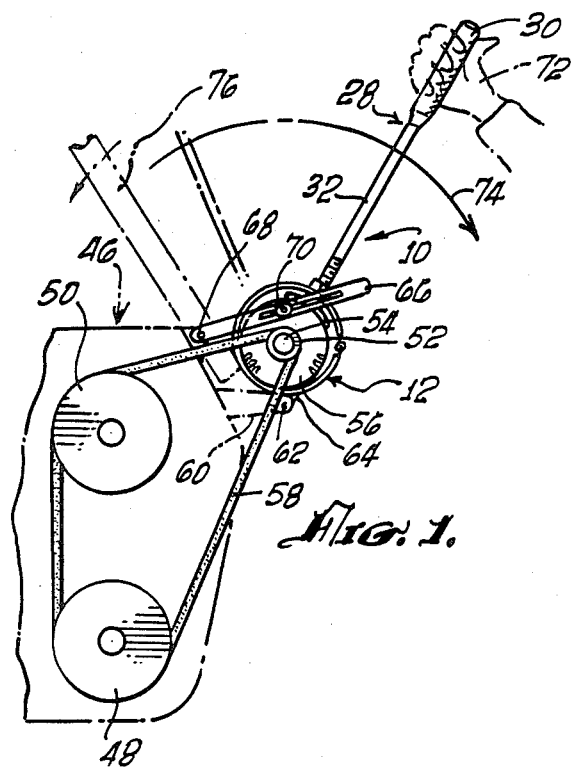
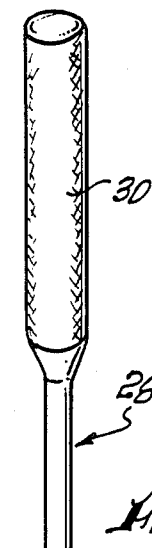
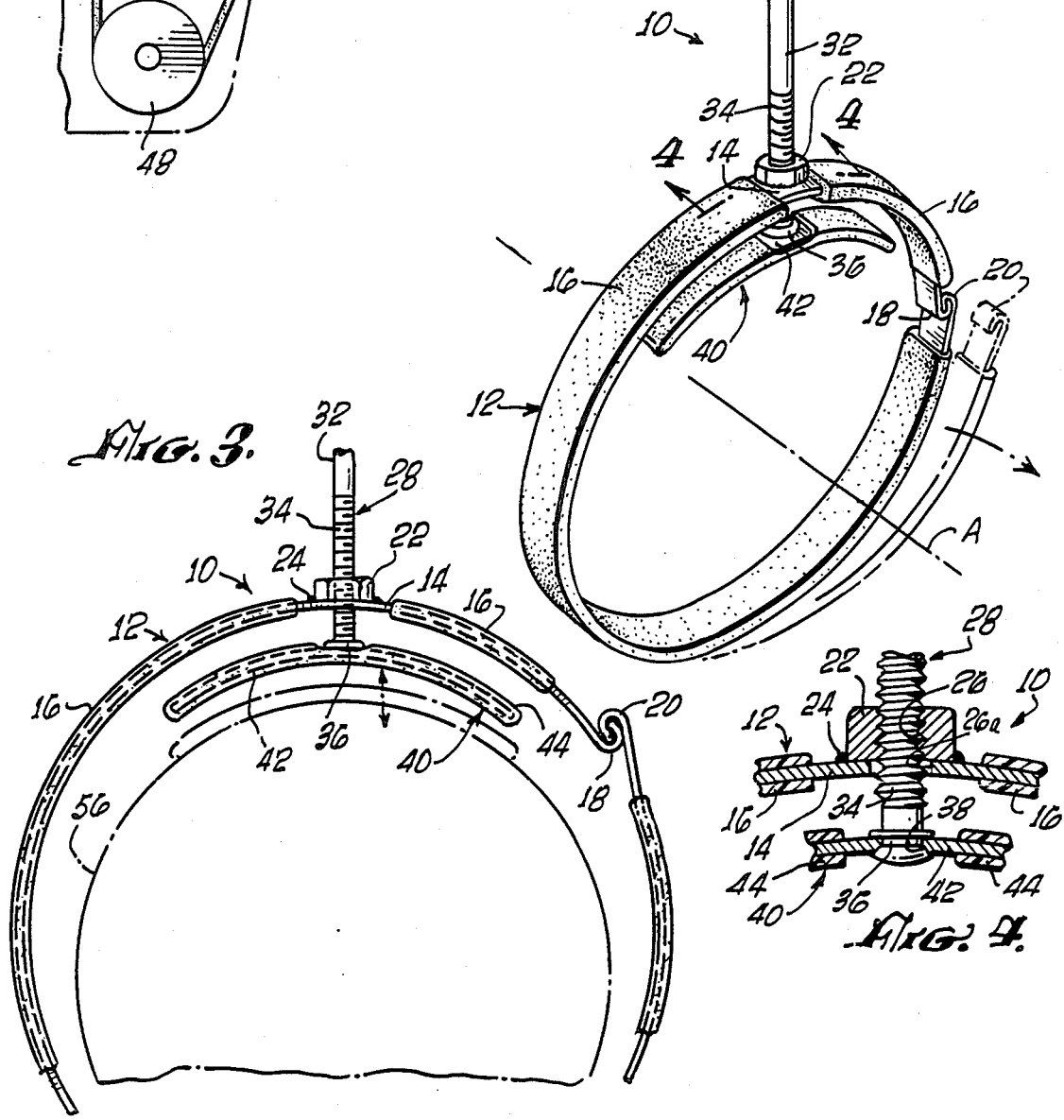

ALTERNATOR AND GENERATOR BELT TENSIONING DEVICE

CROSS REFERENCE TO RELATED PATENT APPLICATIONS

This patent application is not related to any other patent applications filed by me in the United States Patent and Trademark Office.

BACKGROUND OF THE INVENTION

1. Field of the Invention

This invention is in the field of gripping and rotating pivotally mounted generators or alternators to tension the drive pulley or sprocket of the alternator or generator against a drive belt or chain.

2. Background of the Invention

The task of tensioning the drive pulley or sprocket of an alternator or generator of automobile engines, and the like, has always been a problem in the known industry.

For many years the task has been performed by the wedging of a tire iron, crowbar, or piece of wood between the engine and the alternator or generator and then moving the alternator or generator against tension of a chain or drive belt arrangement by a leverage action.

It has always been difficult to move such a generator or alternator to tension the pulley or sprocket by pulling and tugging by hand. The accepted methods previously described offer considerable loss of time, injury to the operator mechanic, and/or damage to the engine and its corresponding parts, not to mention damage to the generator or alternator itself.

The prior art procedures also involve the use of both hands of the mechanic or operator and create difficulties in evolving the amount of tension desired and in being able to tighten necessary fasteners such as bolts, nuts, and the like in order to secure the alternator or generator in a tensioned mode.

A simplified and safe solution to the above problem has long been sought by persons familiar to the trade.

The present device developed by the applicant has provided an operator or mechanic with the ability to apply tension of the drive pulley or sprocket of an alternator or generator which is pivotally mounted to an engine, or the like, while allowing the operator with the freedom of being able to easily affix the tension permanently.

A flexible steel band, which can be coated with a plastic, or the like, is easily placed about the housing of the alternator or generator and is then latched unto itself. A handle, swivelly connected to a clamping pad is threadedly passed through a nutlike enlargement affixed to the band. Rotation of the handle moves the clamping pad against the alternator or generator housing and at the same time allows the flexible plastic coated band to encircle the generator or alternator housing (conforming to many configurations of such housings) and allowing the operator to grasp the handle with one hand and to pull it towards himself, thus effecting the necessary tension against the drive belt or chain.

After the generator or alternator has been secured in the proper position with the desired tension, the operator simply unscrews the handle, releasing the pad from the housing, relieving the band gripping action, and unlatching the band portions from one another. The band and entire tool is then withdrawn from the housing with very little effort.

It is therefore an object of the present invention to provide a simple device for encircling and gripping an alternator or generator housing while having an actuating handle affixed thereto.

It is a further object of the present invention to provide a device for safely moving the drive pulley or sprocket of an alternator or generator against a drive belt or chain.

Another object of this invention is to provide a device with provisions to protect an engine, its related parts, or a generator/ alternator from damage during the operation of tensioning.

Yet a further object of this invention is to provide a device that is very inexpensive to manufacture and which will have a long life expentency.

These and other objects and advantages of the present invention will become apparent to those skilled in the art after considering the following detailed specification together with the accompanying drawings.

BRIEF DESCRIPTION OF THE DRAWINGS

FIG. 1 is a simplified front elevation, on a reduced scale, of the device of the invention being used by an operator;

FIG. 2 is a perspective view of the device of the invention showing (in phantom lines) a disconnected mode of the apparatus ;

FIG. 3 is a fragmentary side elevation of the device of FIGS. 1 and 2; and,

FIG. 4 is enlarged fragmentary section as viewed along line 4—4 of FIG. 2.

DESCRIPTION OF A PREFERRED EMBODIMENT

Referring to the drawings, and particularly to FIGS. 1 and 2, reference numeral 10 is applied to the device in its entirety, generally. A flexible encircling band, 12, is shown as being constructed from as steel band 14 and a coating 16. It is to be understood that both the band and the coating can be made from a variety of materials presently available in the industry.

One end of the band 14 is shown curled about into a configuration which can mate with a similar configuration 20 formed at the opposite end of the band. By moving the ends apart in a direction parallel to the longitudinal axis "A" of the circularly configured band in its completely connected mode (as indicated in FIG. 2) it can be readily seen that the band can easily be disconnected. This is indicated by the phantom line showing in FIG. 2.

The disconnected band then can be easily looped about the housing of an alternator or generator and reconnected in a manner which is just the opposite motion as described to disconnect the connecting ends 18 and 20. This band is loosely fitted about a generator or alternator housing 56, as is indicated in FIG. 3.

A nut, or projection, 22 is shown to be welded at 24 to affix it to the band member 14. (See FIG. 4). The threaded opening at 26 accomodates a handle member 28.

The handle comprises a handle portion 30, a shank 32 and a threaded end 34. The threaded end 34 is shown in contact with internal threads 26 of nut 22 and the end 34 passes through an opening 26a in band 14. The handle is provided with a swivelling end 36 in opening 38 located in clamping member 40.

The clamping member is shown in FIGS. 2 through 4 as a semi-rigid band segment 42 coated by protective covering material 44. When the handle 30 is rotated in a clockwise direction, the threaded end moves toward the axis A and brings the clamping member 40 into contact with the alternator/generator housing 56. This is illustrated in FIG. 3 with the phantom lines and the double-headed arrow.

Further rotation of the handle 30 is executed until the clamping member 40 is firmly gripping the housing of the generator/alternator 56 from any movement between the band 12 and clamping member 40. The band 12, being flexible in nature, will conform to the outline of the generator housing 56 without any damabe to non-circular portions of the housing.

I have shown in FIG. 1 a typical automobile engine 46 having drive pulley 48 attached to the crankshaft of the engine, a driven pulley 50 which normally operates the water pump and cooling fan, and the alternator/generator pulley 52 which is attached to the alternator/generator driven shaft 54. The alternator/generator 56 is shown being moved against the pulley 52 for tensionsing. An attachment 60 which is affixed to the engine provides a support for pivot joint 62 about which the generator/alternator housing pivots. A projection 64 is shown connecting the pivot point 62 to the projection from the engine.

A slotted bracket 66 is pivoted at 68 to the engine and a fastening nut and bolt assembly at 70 is provided to finally secure the alternator/generator and its pulley at the proper tension desired.

FIG. 1 shows the hand of the operator 72 moving the handle 28 in the general direction of the arrow 74 to effect the desired tension. A 2×4 piece of wood is shown as a typical prior art way of prying the housing to the desired tension. This member 76 is often a crowbar, tire iron and any number of items that are used to do the job of tensioning.

To those familiar in the art, it is always possible to slightly alter some of the elements used in the applicant's invention, and the present embodiment described and shown above are described and illustrated for the purpose of illustration only, and not for the purpose of limitation.

The following Claims are presented in this matter.

I claim:

1. An apparatus for applying tension to an alternator/generator driven pulley or sprocket which includes: a flexible strip of material attachable at its ends to itself; such attachment effected by interlocking of inwardly bent first end of said strip of material with an outwardly bent second end of said strip of material, said interlocking being accomplished by bending said flexible strip ends apart from one another until said first and second bent ends are substantially aligned with one another and then said strip ends are interlocked with one another; an elongated handle threadedly affixed to said flexible strip at a point away from said first and second inwardly and outwardly bent ends of approximately 90° from said connected ends, said threaded portion of said handle being threadedly passing through a correspondingly threaded projection on said flexible strip; a swivably connected arcuate clamping member affixed to the end of said threaded handle at its extremity within a circle formed by said flexible strip after being connected to itself at its ends and capable of gripping an alternator/generator housing when said handle is rotated to move said arcuate clamping member against said housing thereby forcing said housing against said arcuate strip at a point opposite said threaded handle.

2. An apparatus as set forth in claim 1 wherein said flexible strip of material and said arcuate clamping member are coated with a protective coating of material such as rubber, plastic, or the like.

* * * * *